Mar. 13, 1923.
C. H. MONTAGUE
AUTOMOBILE LIGHT
Filed Jan. 6, 1920
1,448,636
2 sheets-sheet 1
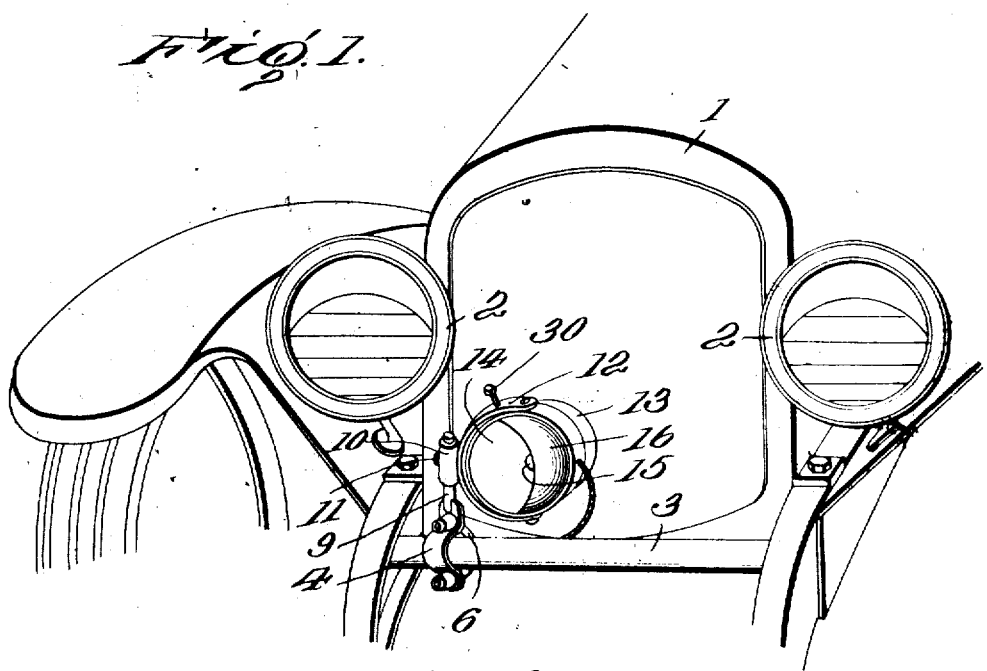
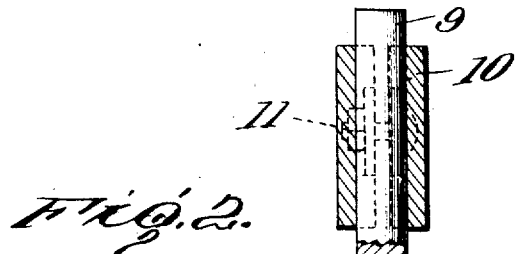
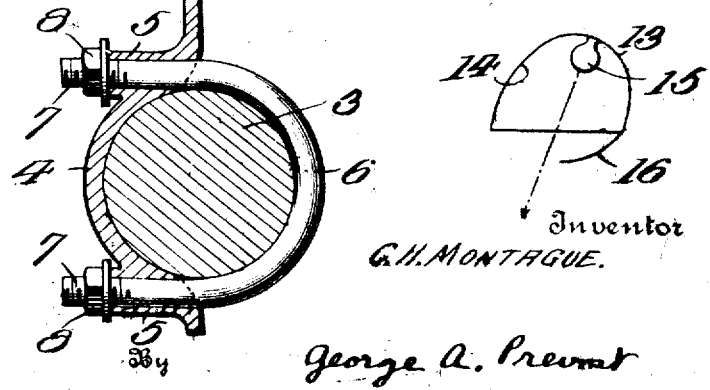
Inventor
C. H. MONTAGUE.
By George A. Prevost
Attorney Mar. 13, 1923.

C. H. MONTAGUE
AUTOMOBILE LIGHT
Filed Jan. 6, 1920

Inventor
C. H. MONTAGUE.

By George A. Prevost
Attorney

Patented Mar. 13, 1923.

1,448,636

UNITED STATES PATENT OFFICE.

CARROLL H. MONTAGUE, OF RICHMOND, VIRGINIA, ASSIGNOR TO SAF-DE-LITE CORPORATION, A CORPORATION OF VIRGINIA.

AUTOMOBILE LIGHT.

Application filed January 6, 1920. Serial No. 349,729.

*To all whom it may concern:*

Be it known that I, CARROLL H. MONTAGUE, a citizen of the United States, residing at Richmond, in the county of Henrico and State of Virginia, have invented certain new and useful Improvements in Automobile Lights; and I do hereby declare the following to be a full, clear, and exact description of the invention, such as will enable others skilled in the art to which it appertains to make and use the same.

This invention relates to illuminating systems for motor vehicles and it is particularly designed to effectively illuminate the road way forward of the vehicle without permitting light rays to reach the eyes of an approaching driver or pedestrian.

The invention consists primarily in locating a spot light below the axis of the ordinary head light and arranging the axis of the spot light reflector in such manner as to direct its rays downwardly and to one side relatively to the path of movement of the vehicle.

One of the objects of the invention is to provide a spot light and supporting means for mounting the spot light, below the ordinary head lights of the vehicle.

A further object of the invention is to furnish said spot light with an opaque shield which will screen one side of the spot light lens and prevent light rays from issuing from that side.

The invention consists in the novel features hereinafter described, in connection with the accompanying drawings and more particularly pointed out in the appended claim.

Referring to the drawings:—

Fig. 1 is a partial perspective view of a motor vehicle with my improvements applied thereto.

Fig. 2 is a detail sectional view of one of the brackets employed in supporting the spot light.

Fig. 3 is a diagrammatic view illustrating the manner in which the parabolic reflector of the spot light directs its rays toward the right.

Figure 4:
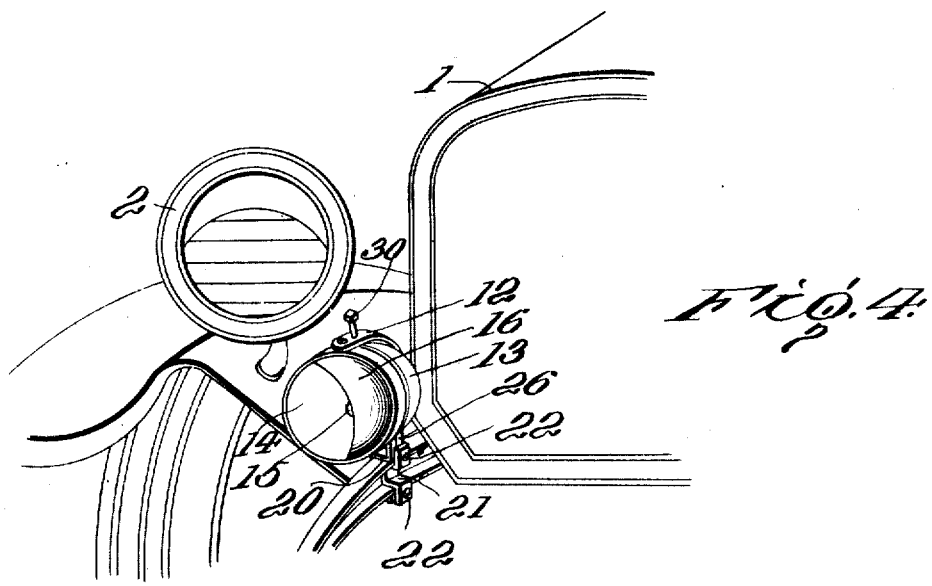
Fig. 4 is a perspective view of a portion of the front of a motor vehicle showing a modified form of supporting bracket for the spot light.

In the embodiment of the invention illustrated in Figs. 1 and 2, 1 represents a motor vehicle having ordinary head lights 2 arranged at each side of the front thereof. Extending between the side plates of the chassis of the vehicle is a horizontal connecting bar 3 upon which is mounted the bracket for supporting the spot light.

This bracket consists of a curved plate 4 having parallel sleeves 5. The inner surface of the plate 4 is designed to engage one side of the bar 3 and a U-shaped bolt 6 passes around the other side of the bar and has threaded ends 7 which pass through the sleeves 5 and are secured in place by means of nuts 8. Extending upwardly from the plate 4, is a bar 9 to which is secured a split sleeve 10 having an adjusting bolt and nut 11 for securing it upon the bar 9. This sleeve carries a yoke-shaped member 12 in which is pivotally mounted a spot light 13 having a parabolic reflector 14, a light bulb 15 and an opaque shield 16. The parabolic reflector has its axis arranged in such manner that the light rays are directed downwardly and to the right, and the shield 16 covers the left hand portion of the spot light lens and prevents its rays from reaching the eyes of an approaching driver or pedestrian.

The pivotal connection of the spot light 13 with the member 12 is such that friction surfaces are provided between the parts, so that the spot light will remain in the position to which it is adjusted.

It has been proposed heretofore to use a spot light in connection with the ordinary lamps of a vehicle, but this spot light was usually arranged to the rear of the vehicle hood and as some of its rays reached the hood and were reflected thereby, it caused annoyance to the driver of the vehicle having the spot light and also to the driver of an approaching vehicle. By placing the spot light forward of the hood, this trouble is eliminated and by arranging the spot light below the level of the ordinary head lights, said head lights will function in the ordinary manner without interference by the spot light.

Figure 5:
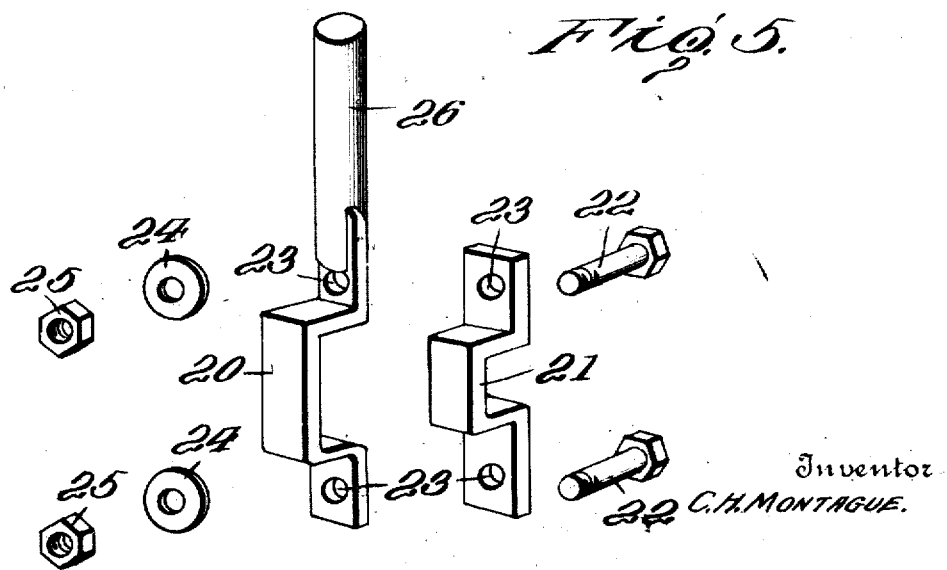
Fig. 5 is a perspective view of the details or parts of the modified bracket.

The construction just described is provided for use with vehicles having a horizontal bar extending across the front of the same and in order to render the device capable of use with vehicles of other construction, I have provided a bracket capable of being attached to the front of one of the vehicle springs or front of the side bar of the chassis. This embodiment is shown in Figs. 4 and 5 in which 20 represents an angular shaped member designed to engage the outer portion of one of the side bars of the vehicle chassis and held in engaging position by means of a similar plate 21 which engages the opposite side of the side bar and is secured in place by means of bolts 22 which pass through apertures 23 in the parts 20 and 21 and are provided with washers 24 and nuts 25. The member 20 has a vertical extension 26 and the lamp 13 shown in Fig. 4, is connected to the bar 26 in a manner similar to that shown by the parts in Figs. 1 and 2.

The lamp or spot light 13, in this instance, also directs its rays downwardly and to the right, so that it will illuminate the right hand side of the road forward of the vehicle without permitting the objectionable glare to reach the eyes of an approaching driver or pedestrian.

In order to prevent the spot light from moving after the same has been adjusted, I have provided a set screw 30, the end of which impinges against the exterior of the spot light casing.

I am aware in certain localities, that traffic moves toward the left instead of the right, and in such places the spot light may be adjusted to direct its rays toward the left and the shield will be placed on the other side of the lamp.

What I claim and desire to secure by Letters Patent is:—

The combination with a motor vehicle, of a lamp mounted forwardly of the vehicle hood and comprising a reflector member, a lens member and a source of light, means for adjusting the lamp permanently in a position to cause the light rays to be constantly directed forwardly, downwardly, diagonally across and to one side only of the path of movement of the vehicle and a shield arranged over a portion of one side of the lens member preventing any rays from the source of light being directed to the opposite side of the path of movement of the vehicle.

In testimony whereof I affix my signature.

CARROLL H. MONTAGUE.